United States Patent [19]

Dunlop et al.

[11] Patent Number: 4,679,704
[45] Date of Patent: Jul. 14, 1987

[54] GRAVITY PIPE TRANSPORT SYSTEM

[76] Inventors: Raymond B. Dunlop, 411 Chitek Crescent, Saskatoon, Saskatchewan, Canada, S7K 5C1; William E. G. Taylor, 810 Gordon Street, Moosomin, Saskatchewan, Canada, S0G 3N0

[21] Appl. No.: 792,030

[22] Filed: Oct. 28, 1985

[30] Foreign Application Priority Data

Oct. 31, 1984 [CA] Canada .................................. 466689

[51] Int. Cl.<sup>4</sup> ...................... B65G 11/20; B65G 53/66
[52] U.S. Cl. ........................................ 222/56; 193/34; 406/14; 406/30
[58] Field of Search ..................... 406/14, 30; 193/34, 193/DIG. 2; 222/55, 56; 198/524

[56] References Cited

U.S. PATENT DOCUMENTS

| 2,347,271 | 4/1944 | Linn .................................. 406/68 X |
| 2,771,323 | 11/1956 | Taylor .................................. 406/14 |
| 2,913,281 | 11/1958 | LeBlanc . | |
| 3,599,832 | 8/1971 | Smith .................................. 222/1 |
| 3,976,331 | 8/1976 | Kluger et al. . | |
| 4,284,032 | 8/1981 | Moos et al. ........................ 118/684 |
| 4,368,678 | 1/1983 | Ulveling ........................... 406/30 X |
| 4,402,635 | 7/1981 | Maruo .................................. 406/14 |
| 4,490,077 | 7/1982 | Shimada et al. .................... 406/124 |

FOREIGN PATENT DOCUMENTS

| 473621 | 5/1951 | Canada . |
| 490535 | 2/1953 | Canada . |
| 649263 | 9/1962 | Canada . |
| 820064 | 8/1969 | Canada . |
| 1099689 | 4/1981 | Canada . |
| 1122133 | 4/1982 | Canada . |

Primary Examiner—Jeffrey V. Nase
Attorney, Agent, or Firm—Burns, Doane, Swecker & Mathis

[57] ABSTRACT

This invention relates to apparatus for the pipe transport of material comprising non-slurried solids particles by means of a pipe which is generally upright. The material to be transported and also air are introduced at the top of the pipe. In order to prevent plug-up of the pipe the material and air flow rates are controlled by means of a central processing unit. A plurality of monitors located along the length of the pipe provide to the central processing unit signals indicative of the pressure in the pipe at the various locations.

13 Claims, 3 Drawing Figures

GRAVITY PIPE TRANSPORT SYSTEM

This invention relates to the pipe transport of material comprising non-slurried solids particles by gravity flow and more specifically to a system for such pipe transport employing monitor and control apparatus designed to ensure a reliable and efficient transport operation at capacity flow rates.

Gravity pipe transport of non slurried solids particles has been used as a transport means for various materials in many different applications. The known gravity transport systems have been of short vertical drop (usually less than 50 m but some of length up to 400 m). The operational procedure has historically been developed through empirical assessment and intuitive adjustment of an operational system. The sensitivity of pipe flow conditions to operational irregularities such as change to solids flow rate, change to air flow rate, change to moisture content, change to particle size, etc. can cause and has caused pipe plug-ups. The sensitivity or response to operational irregularities is magnified many fold with an increasing length of vertical drop; that is, plug-ups become more frequent the longer the pipe. The historical solution to a plugged pipe has been to invent methods to unplug the pipe which invariably necessitate the installation of more than one pipe so that pipe transport can continue while the plugged pipe is being unplugged.

Pipe plug-ups become a more frequent and more costly problem with increasing length of vertical drop. Firstly, the capital expenditure required to install a standby pipe increases with the length of pipe. Secondly, the frequency and severity of plug-up increases with the length of pipe which means a longer time is required to unplug the pipe thus increasing operation expenditure.

The gravity pipe transport system of the invention employs a pipe at least the major portion of which is generally upright. The pipe need not be precisely vertical but should not depart from the vertical by more than a relatively small angle. Satisfactory operation may be attained at angles substantially in the range of 75° to 90° to the horizontal.

This invention approaches the problem of gravity pipe transport by the mathematical assessment of parameters that affect the sensitive internal pipe flow conditions. Plug-ups are then prevented through the stringent control of the sensitive parameters that govern gravity pipe transport.

The utility of this invention is to eliminate pipe plug-ups and thereby improve the reliability, efficiency and capacity of gravity transport systems. Assurance of the operational reliability decreases capital expenditures for a gravity transport system because the current requirements for two pipes per system (one to operate while the other is plugged) are reduced to one pipe. The increased throughput and elimination of plug-ups lowers the direct operational costs of a gravity transport system.

Equations to predict flow of solid particles in a gravity transport pipe were developed from fundamental fluid mechanics principles. Two pipe flow regimes that are critical to the reliable operation of a gravity pipe transport system exist within the vertical section of the pipe. In the upper section of the pipe there is a zone in which solid particles are accelerated by gravity and push air down the pipe thereby depressurizing the upper section of the pipe. The second flow regime is located in the lower section of the pipe. This zone is characterized by pressurization caused by air densification due to accumulation of evacuated air from the upper section which encounters the resistance of atmospheric pressure at the pipe exit. Thus, solid particles decelerate in the lower section of the pipe due to the pressurized atmosphere in that zone.

Control of the initial location of the flow regime interface upon start up and subsequent control of its vertical fluctuation during steady operation is critical to the efficient and reliable drop pipe transport of non-slurried solids particles.

Each drop pipe system has a unique location for the flow regime interface which is highly dependent upon the pipe diameter, pipe length, solids flow rate and air flow rate. Other factors have a minor effect upon the flow regime interface.

A pipe plug-up is caused by either improperly controlled start up procedure (the most common) or sudden increase of the solids flow rate during normal operation.

To ensure a reliable start up the location of the flow regime interface must be gradually pushed down the vertical pipe by a gradual increase of the solids flow rate combined with a gradual decrease of the air flow rate. A start up procedure which fails to control the flow regime interface location is prone to plug-up. For example a high solids flow rate rapidly pushes the air out of the top part of the pipe; this creates a two-fold problem: firstly, very low pressure in the upper section of pipe which allows rapid acceleration of the solids particles and secondly, very high pressure in the lower section of pipe which allows rapid deceleration of the solids particles. The net effect is a flow regime interface that is located too far down the pipe. The initial counteraction to a rapid start up is a large loss of energy at the regime interface caused by excessively high rates of particle collision. The energy loss translates into a loss of particle velocity within the pipe and the relocation of the flow regime interface to a higher pipe elevation than required for steady state operation. This drop pipe transport phenomenon is known as "chugging" or "surging" and is invariably a signal of plug-up if corrective action is not taken.

Sudden and large changes in the solids flow rate during operation also cause the location of the flow regime interface to oscillate. If the oscillation is not dampened the pipe will plug.

A reliable shut down requires the activation of the air flow valve such that the maximum air flow available to the pipe is achieved simultaneously with the cessation of solids flow.

The importance of monitoring and controlling the critical flow parameters of a pneumatically assisted pipe has previously been recognized. U.S. Pat. No. 4,402,635 issued Sept. 6, 1983 to Toshio Maruo indicates that monitoring and controlling the particulate-to-air ratio in a multi-pipe system is a very important condition for optimum performance. However, the Maruo conveyor system differs from that of the present invention in that a plurality of parallel transport pipes are employed and the air is passed through the pipes at high velocity to transport particulate solids. Each pipe is provided with a flow regulator which is intended to keep the air flow through the pipe constant. Criteria for optimum performance of a gravity pipe transport system is very important but has never been recognized or controlled previously.

The present invention is directed to apparatus and method of monitoring and controlling the solids to air flow rate so that operation is reliable and efficient. Mathematical evaluation fine tuned by empirical data determines the optimum solids flow/air flow rates required for steady state flow conditions.

The mathematical model is developed from the basic laws of conservation of mass and momentum as well as from fundamental principles of fluid mechanics.

The critical unknowns which must be solved in order to establish and maintain steady state pipe flow conditions are the air flow rate and the solids flow rate. The model predicts the concentration of solids particles, the velocity of solids, the velocity of air and the pressure at various elevations within the pipe. The atmospheric pressure at the entrance to the pipe and the exit from the pipe can be measured and is therefore a known quantity.

Various input values for the air flow rate and the solids flow rate are assumed, are entered into the mathematical model, and are validated through iterative solution. The air flow rate and solid particle flow rate values are considered valid when the mathematical model solves the equation such that the calculated pipe pressure and the measured pipe pressure at the pipe exit are the same value. The mathematical solution for the pressure profile along the entire pipe length is also considered valid at this state of the solution.

The latter mentioned procedure is repeated to establish an operating range for air flow rates to each of a number of ranges of solids flow rates which would typify the specific pipe operational requirements for tonnage throughput.

This predetermined site specific data is programmed into a central processing unit that will control the solids flow rate and the air flow rate to assure steady state pipe operation.

A sealed system with a plurality of monitoring stations spaced along the length of the pipe measures the pressure and produces signals which are fed to the central processing unit. From these signals the actual position of the flow regime interface is determined. From comparisons of the desired and actual positions of the flow regime interface the central processing unit produces control signals which are employed to activate a pneumatically controlled butterfly valve which controls the air flow rate and/or a variable speed electric drive unit which controls the solids flow rate so as to cause the actual flow regime interface to approach the desired position and to stabilize it.

It is an object of the invention to provide a gravity flow system for material comprising non-slurried solids particles which operates reliably and efficiently at capacity flow rates.

It is a further object of the invention to provide a gravity flow system for material comprising non-slurried solids particles which is highly resistant to pipe plug-up.

It is a more specific object of the invention to provide a gravity flow pipe transport system for material comprising non-slurried solids particles wherein the solids and air flow rates in the pipe are controlled so as to ensure non-interrupted operation.

In accordance with the invention there is provided a gravity flow pipe transport system for material comprising non-slurried solids particles, said system comprising a pipe of which at least a major portion is generally upright; controllable supply means to supply said material to the upper end of said pipe; controllable air flow means to provide a flow of air into said pipe; monitoring means to provide signals indicative of the pressures at a plurality of locations along the length of said pipe; control means responsive to the signals provided by said monitoring means to vary the rate at which said material is supplied to said pipe and the rate of air flow into said pipe whereby plugging of said pipe by said material is substantially eliminated.

There is further provided in accordance with the invention a method of controlling gravity flow of material comprising non-slurried solids particles in a pipe transport system said method comprising: providing a pipe of which at least a major portion is generally upright; feeding said material to the upper end of said pipe at a controllable rate; supplying a controllable air flow into said pipe; monitoring the pressure at a plurality of locations along the length of said pipe to derive signals indicative of the pressure at each of said locations; controlling the rates of feeding said material and of air flow in accordance with the values of said signals to substantially eliminate plugging of said pipe by said material.

An embodiment of the invention will now be described which is to be read in conjunction with the accompanying drawings in which.

Figure 1:
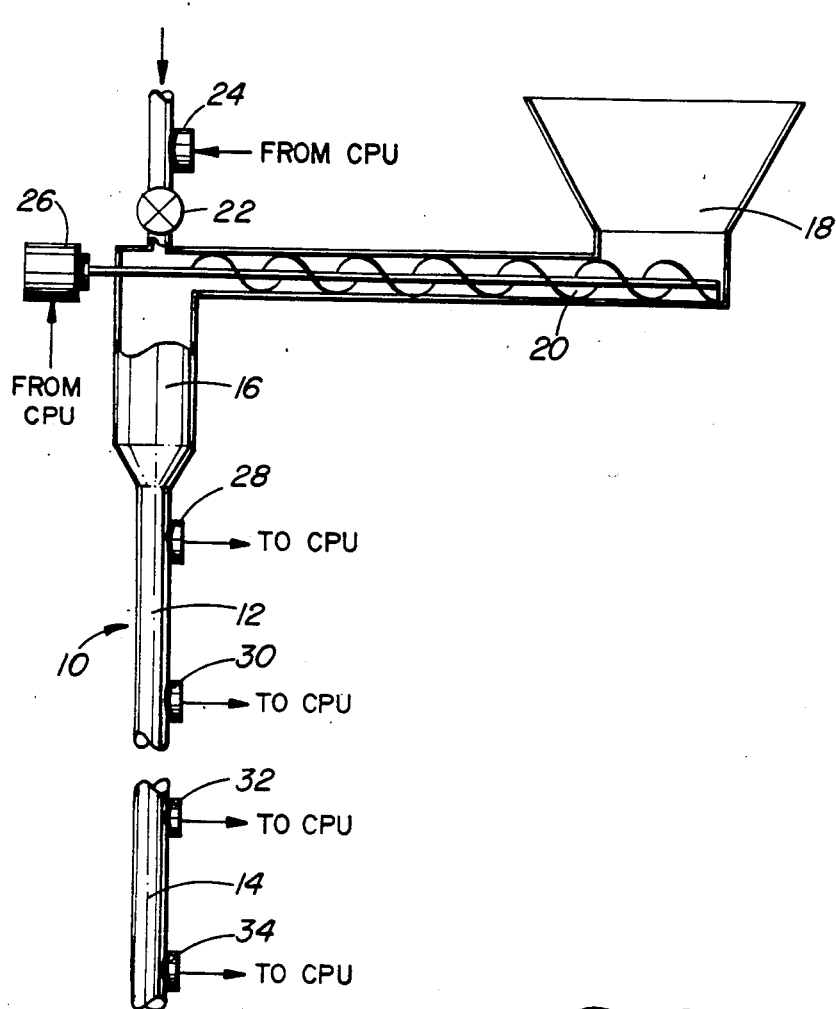
FIG. 1 is a diagrammatic view of the pipe transport system of the invention.

The gravity pipe transport system illustrated in FIG. 1 includes the vertical pipe 10, a feed hopper 18 from which the material is fed to the pipe by means of an auger 20, driven at variable speed by power unit 26. Although a variable speed auger is illustrated in the embodiment being described other variable rate delivery means may be employed to feed the material to the vertical gravity transport pipe. The auger is driven at variable speed by power unit 26 to control the rate of solids flow into the pipe 10. The feed hopper 18 is usually open to the atmosphere to facilitate ease of material loading but could be sealed if the conveyance material requires protection from the elements.

The system includes a transition piece 16 that connects the auger conduit to the vertical pipe 10.

The transition piece 16 is required to connect an other than round auger conduit of large size to the circular and relatively smaller vertical pipe tube conduit 10.

An air valve 22 is located at the top of the transition piece, and by means of valve control 24 the air flow rate into the pipe is controlled. Apart from air valve 22 the system should be air tight; hence, the auger or other conveying means for the solids material must be such as to avoid the passage of air therealong.

The vertical pipe 10 may or may not require an elbow at the bottom depending on the requirements of a particular installation. The design at the exit of the pipe is site specific; however, the exit design must be considered in the calculation of the pipe flow conditions and thus the location of the flow regime interface. The pipe flow conditions become more sensitive to operational change as the radius of curvature of the elbow becomes smaller.

Pressure transducers 28, 30, 32 and 34 are located on pipe 10 to determine the pressure at spaced apart positions along the length of the pipe. Transducer 28 is located near the top of the pipe and transducer 34 near the exit. It is to be understood that, although four transducers are shown in FIG. 1 that more may be used.

Figure 3:
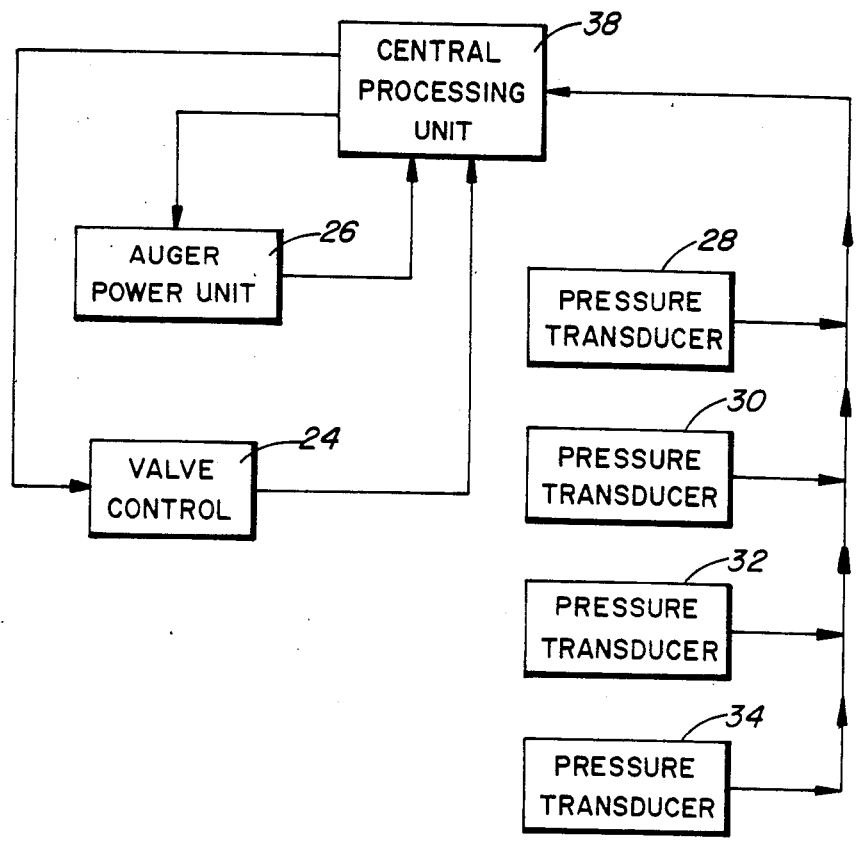
FIG. 3 is a block diagram of the control features of the invention.

Pressure transducers 28, 30, 32 and 34 produce signals indicative of pressure. Analysis of the pressure values is used to determine the location of the flow regime interface. The transducer signals are relayed to central processing unit 38 as shown in FIG. 3.

A pulse counter located at the auger power unit 26 monitors the auger power unit's revolutions per minute which are transmitted by signal to the central processing unit where the rpm can be directly related to the established solids flow rate.

The valve position of the air valve control 24 is monitored and the signal transmitted to the central processing unit 28 where the valve position can be related to the established air flow rate.

The central processing unit determines from the pressure readings the location of the flow regime interface for the various solids flow rates that the pipe will encounter under operation and during start-up. The central processing unit calculates the position of the actual flow regime interface at any particular time during operation of the system and compares this actual location with the ideal location which has been preprogrammed into the central processing unit. Signals are then relayed from the central processing unit to the variable speed auger drive unit 26 and to air valve control 24 to adjust the solids flow rate and the air flow rate, if a change is required to the position of the flow regime interface.

Figure 2:
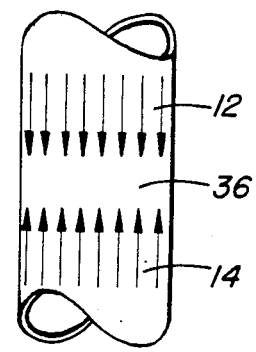
FIG. 2 is a diagrammatic view of a section of the vertical gravity pipe illustrating the flow regime interface.

FIG. 2 illustrates the position of the flow regime interface (shown at 36) between the upper section 12 of pipe 10 where the depressurized zone caused by the downward flow of the solids particles accelerated by gravity reduces the pressure therein and the lower section 14 of the pipe where there is increased air pressure due to accumulation therein of air forced downward from the upper section.

It is to be understood that although a single embodiment only of the invention has been described that many variations of the structure of the system are possible without departing from the scope of the invention. The invention includes all such variations as would occur to one skilled in the art and is delineated not by the preceding example but solely by the appended claims.

We claim:

1. A gravity flow pipe transport system for material comprising non-slurried solids particles, said system comprising:
    a pipe of which at least a major portion is generally upright, said pipe having an upper section and a lower section;
    controllable supply means to supply said material to the upper section of said pipe;
    controllable air flow means to provide a flow of naturally aspirated air into said pipe;
    monitoring means to provide signals indicative of the pressures and the location of flow regimes and a flow regime interface therebetween at a plurality of locations along the length of said pipe;
    control means responsive to the signals provided by said monitoring means to vary the rate at which said material is supplied to said pipe and the rate of air flow into said pipe whereby plugging of said pipe by said materials is substantially eliminated.

2. A gravity flow transport system as claimed in claim 1, wherein said flow regime in the upper section of the pipe is characterized by the presence of a depressurization zone and said flow regime in the lower section of the pipe is characterized by a pressurization zone and the control means controls the position of said interface between the depressurization and pressurization zones.

3. A gravity flow transport system as claimed in claim 1 wherein during start up the control means acts to increase gradually the solids flow rate and simultaneously acts to decrease gradually the air flow rate.

4. A gravity flow transport system as claimed in any one of claims 1, 2 or 3 wherein the controllable air flow means comprises an air valve.

5. A gravity flow transport system as claimed in any one of claims 1, 2 or 3 wherein the monitoring means comprise pressure transducers.

6. A gravity flow transport system as claimed in any one of claims 1, 2 or 3 wherein the control means comprises a central processing unit, said central processing unit being adapted to generate signals to control said controllable air flow means and said controllable supply means to control the rates of air flow and of supply of said material respectively.

7. A gravity flow transport system as claimed in any of claims 1, 2, or 3 wherein said control means comprises a central processing unit, said central processing unit receiving the signals from said monitoring means, assessing the data provided by said signals, calculating the actual location of said flow regime interface in the pipe from said data, comparing the actual location of said flow regime interface to the ideal location of said flow regime interface previously programmed into said central processing unit, generating signals indicative of the difference between said actual location and said ideal location and applying said signals to said controllable supply means and said controllable air flow means.

8. A gravity flow pipe transport system as claimed in any one of claims 1, 2 or 3 wherein said major portion of the pipe has an inclination to the horizontal substantially in the range of between 75° and 90°.

9. A gravity flow transport system as claimed in claim 1 wherein the control means acts to prevent oscillatory vertical fluctuation of the flow regime interface in the pipe during normal operation.

10. A gravity flow transport system as claimed in claim 1 wherein the controllable supply means comprises a variable speed auger which restricts uncontrolled material feed into the pipe.

11. A gravity flow transport system as claimed in claim 9 or 10 wherein the control means comprises a central processing unit, said central processing unit being adapted to generate signals to control said controllable air flow means and said controllable supply means to control the rates of air flow and of supply of said material respectively.

12. A gravity flow pipe transport system as claimed in any one of claims 9 or 10 wherein said major portion of the pipe has an inclination to the horizontal substantially in the range of between 75° and 90°.

13. A method of controlling gravity flow of material comprising non-slurried solids particles in a pipe transport system, said method comprising:
    providing a pipe of which at least a major portion is generally upright, said pipe having an upper section and a lower section;
    feeding said material to the upper section of said pipe at a controllable rate;
    supplying a controllable naturally aspirated air flow into said pipe;

monitoring the pressure at a plurality of locations along the length of said pipe to derive signals indicative of the pressures and the location of flow regimes and a flow regime interface therebetween at each of said locations;
controlling the rates of feeding said material and of air flow in accordance with the values of said signals to substantially eliminate plugging of said pipe by said material.

* * * * *